US012264297B2

(12) United States Patent
Lee et al.

(10) Patent No.: US 12,264,297 B2
(45) Date of Patent: Apr. 1, 2025

(54) FABRIC SOFTENER COMPOSITION FOR LIQUID CARBON DIOXIDE-BASED CLEANING

(71) Applicant: LG Electronics Inc., Seoul (KR)

(72) Inventors: Jongseok Lee, Seoul (KR); Sunggyun Kim, Seoul (KR); Myunghun Im, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 17/563,342

(22) Filed: Dec. 28, 2021

(65) Prior Publication Data

US 2022/0204887 A1 Jun. 30, 2022

(30) Foreign Application Priority Data

Dec. 28, 2020 (KR) ........................ 10-2020-0185348

(51) Int. Cl.

| | |
|---|---|
| ***C11D 1/38*** | (2006.01) |
| ***C11D 1/46*** | (2006.01) |
| ***C11D 1/62*** | (2006.01) |
| ***C11D 3/00*** | (2006.01) |

(52) U.S. Cl.

CPC .............. *C11D 3/0015* (2013.01); *C11D 1/62* (2013.01)

(58) Field of Classification Search

CPC .... C11D 1/38; C11D 1/46; C11D 1/62; C11D 3/0015; C11D 3/2093; C11D 3/3927; C11D 7/266

See application file for complete search history.

(56) References Cited

U.S. PATENT DOCUMENTS

| | | | |
|---|---|---|---|
| 5,652,206 | A | 7/1997 | Bacon et al. |
| 5,916,863 | A | 6/1999 | Iacobucci et al. |
| 6,004,913 | A | 12/1999 | Iacobucci et al. |
| 6,037,315 | A | 3/2000 | Franklin et al. |
| 6,148,645 | A | 11/2000 | DeYoung et al. |
| 6,269,507 | B1 | 8/2001 | DeYoung et al. |
| 6,280,481 | B1 | 8/2001 | Storey-Laubach et al. |
| 6,499,322 | B1 | 12/2002 | DeYoung et al. |
| 6,711,773 | B2 | 3/2004 | DeYoung et al. |
| 6,770,608 | B2 | 8/2004 | Franklin et al. |
| 7,044,143 | B2 | 5/2006 | DeYoung et al. |
| 2002/0025915 | A1 | 2/2002 | Franklin et al. |
| 2002/0194681 | A1 | 12/2002 | DeYoung et al. |
| 2003/0033676 | A1 | 2/2003 | DeYoung et al. |

FOREIGN PATENT DOCUMENTS

| | | | |
|---|---|---|---|
| EP | 1352948 | 10/2003 | |
| GB | 2353807 | * 3/2001 | .......... D06M 13/463 |
| JP | 2019044278 | 3/2019 | |
| KR | 20020005746 | 1/2002 | |
| WO | WO2000070141 | 11/2000 | |
| WO | WO2012146304 | 11/2012 | |

OTHER PUBLICATIONS

Extended European Search Report in European Appln. No. 21217808.1, dated Jun. 7, 2022, 7 pages.

International Search Report in International Appln. No. PCT/KR2021/019958, dated Apr. 11, 2022, 3 pages.

* cited by examiner

*Primary Examiner* — Brian P Mruk

(74) *Attorney, Agent, or Firm* — Fish & Richardson P.C.

(57) ABSTRACT

A fabric softener composition for liquid carbon dioxide-based cleaning includes: an organic solvent expressed as chemical formula 1, and a cationic surfactant, where the chemical formula 1 is R1-O—(CO)—O—R2, and R1 and R2 are hydrogen (H) or an alkyl group having 1 to 4 carbon atoms.

4 Claims, No Drawings

FABRIC SOFTENER COMPOSITION FOR LIQUID CARBON DIOXIDE-BASED CLEANING

CROSS-REFERENCE TO RELATED APPLICATION

This application claims priority to and the benefit of Korean Patent Application No. 10-2020-0185348, filed on Dec. 28, 2020, the disclosure of which is incorporated herein by reference in its entirety.

TECHNICAL FIELD

The present disclosure relates to a fabric softener composition having excellent usability for high-pressure liquid carbon dioxide cleaning.

BACKGROUND

A washing process during which contaminants of fabrics or clothes are removed is classified into two processes. The two processes are as follows.

A first process involves dispersing a surfactant in water to increase alkalinity of the water, removing contaminants, and rinsing, dehydrating and drying fabrics or clothes. In this process, laundry detergents are used.

Secondly, under the alkaline conditions, the fabrics or clothes are washed, based on a physical force of a washing machine that operates for a predetermined period of time. A second process involves removing hydrophobic contaminants (oily contaminants) of fabrics or clothes (e.g., natural protein fibers such as wool or silk, and rayon or acetate), which are vulnerable to deformation of the surfaces and insides of the fabrics or clothes, loss of the gloss of the fabrics or clothes, relaxation or shrinkage of the fabrics or clothes and the like, by using a solvent such as petroleum-based, chlorine-based, glycol ester-based, ring-type silicon or silicon-based, fluorine-based, terpene oil including limonene and the like-based solvents, and the like, removing the solvents from the fabrics or clothes by using a physical method, and drying the fabrics and clothes to vaporize the solvents. This process refers to dry cleaning.

The first washing process using ordinary laundry detergents consume a large amount of water. Accordingly, in the first washing process, hydrophobic contaminants are less likely to be removed while hydrophilic contaminants are removed effectively. Further, the fabrics or clothes are exposed to the alkaline washing conditions and water for a long period of time, causing the deformation of the surfaces and insides of the fabric or clothes. As a result, the loss of the gloss of the fabrics or clothes, the relaxation or shrinkage of the fabrics or clothes and the like can occur.

In recent years, liquid neutral detergents have been widely used for washing fabrics or clothes without causing damages and deformation to the fabrics or clothes, that could be caused by alkalis. However, the neutral detergents need to be diluted with water for use, thus, there is still a possibility that the fabrics or clothes are deformed.

The dry cleaning process can remove oily contaminants effectively. However, in the dry cleaning process, materials harmful to the human body or the environment or materials having high inflammability and poor polymer stability are used. Accordingly, the materials can cause failure of a washing device and a fire.

Under the circumstances, research has been performed into a material for washing and dry cleaning, which is safer, becomes more environmentally friendly and ensures energy efficiency.

The US and European countries have adopted a liquid carbon dioxide for cleaning instead of using various type of chemical materials used for existing washing and dry cleaning processes, as a material for cleaning that is eco-friendly and ensures excellent energy efficiency. A washing process using the liquid carbon dioxide has no adverse effect on the human body and the environment unlike the existing washing and dry cleaning processes. Additionally, the liquid carbon dioxide-based cleaning enables laundry to be washed at a low temperature and ensures energy efficiency, and the liquid carbon dioxides can be recycled after cleaning. Thus, a number of wash and cleaning cycles increases.

The liquid carbon dioxide-based cleaning helps to wash/rinse/dry various types of clothes and remove contaminants left of the clothes by using a change in the gas and liquid phases of carbon dioxide within a short period of time, without damaging the clothes. In the liquid carbon dioxide-based cleaning, liquid-phase carbon dioxides perform washing and rinsing at a high pressure. In the drying procedure, the liquid-phase carbon dioxides on the clothes vaporize at a low pressure and are removed from the clothes rapidly. Thus, the liquid carbon dioxide-based cleaning requires no drying procedure.

In the rinsing procedure of the liquid carbon dioxide-based cleaning, a fabric softener can be used.

An ordinary fabric softener on the market can be used in the liquid carbon dioxide cleaning process.

However, when the ordinary fabric softener is used in the liquid carbon dioxide-based cleaning, a problem can occur.

The ordinary fabric softener includes water, a surfactant, and components such as a solubilizing agent. The ordinary fabric softener does not have enough solubility to be diluted with a non-polar solvent such as liquid carbon dioxide. Accordingly, in the liquid carbon dioxide-based cleaning, effective components of the ordinary fabric softener are not dissolved sufficiently, thereby causing deterioration in softening performance.

Further, when the ordinary fabric softener is used in the liquid carbon dioxide-based cleaning, pressure in a tub decreases. Accordingly, carbon dioxide vaporizes, and bubbles are generated rapidly, thereby damaging laundry to be washed.

To solve the above problems, there is a growing need for a new fabric softener composition exclusive for the liquid carbon dioxide-based cleaning, which can be dissolved sufficiently in liquid carbon dioxide and minimize generation of bubbles without decreasing pressure in a tub.

SUMMARY

The present disclosure is directed to a fabric softener composition for liquid carbon dioxide-based cleaning that has a new system.

The present disclosure is also directed to a fabric softener composition for liquid carbon dioxide-based cleaning that has enough solubility to be diluted with a non-polar solvent such as liquid carbon dioxide.

The present disclosure is also directed to a fabric softener composition for liquid carbon dioxide-based cleaning that minimizes generation of bubbles without decreasing pressure in a tub for liquid carbon dioxide-based cleaning.

According to one aspect of the subject matter described in this application, a fabric softener composition for liquid carbon dioxide-based cleaning can include an organic solvent expressed as chemical formula 1, and a cationic surfactant. The chemical formula 1 can be R1-O—(CO)—O—R2, where R1 and R2 are hydrogen (H) or an alkyl group having 1 to 4 carbon atoms.

Implementations according to this aspect can include one or more of the following features. For example, the organic solvent can include one or more selected from a group consisting of propylene carbonate, ethylene carbonate, trimethyl carbonae, dimethyl carbonate, and dimethyl dicarbonate.

In some implementations, the cationic surfactant can include a compound expressed as chemical formula 2, where the chemical formula 2 is:

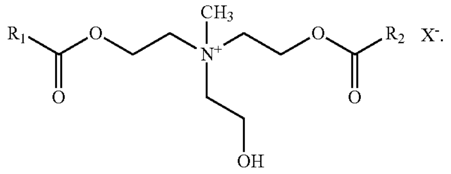

R1 and R2 can be an alkyl or alkenyl group having 8 to 22 carbon atoms and, and X can be one of Cl, CH3OSO3 and CH3CH2OSO3.

In some examples, the cationic surfactant can include a compound expressed as chemical formula 3, where the chemical formula 3 is:

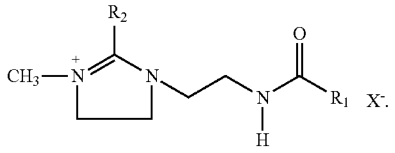

R1 can be an alkyl or alkenyl group having 8 to 22 carbon atoms, R2 is (H) or an alkyl or alkenyl group having 1 to 4 carbon atoms, and X can be one of Cl, CH3OSO3, and CH3CH2OSO3.

In some implementations, the cationic surfactant can include one or more selected from a group consisting of distearic ester ammonium salt, dioleic ester ammonium salt, dilauric ester ammonium salt, monostearyl aminoethylene imidazoline ammonium salt, monooleic aminoethylene imidazoline ammonium salt, and monolauryl aminoethylene imidazoline ammonium salt.

In some implementations, the fabric softener composition can include 5-10 wt % of the organic solvent, 5-25 wt % of the cationic surfactant, and water as a remaining part.

According to the present disclosure, a fabric softener for liquid carbon dioxide-based cleaning can have enough solubility to be diluted with a non-polar solvent such as liquid carbon dioxide.

Additionally, the fabric softener for liquid carbon dioxide-based cleaning can include an organic solvent having excellent affinity with a non-polar solvent such as liquid carbon dioxide and with a cationic surfactant that is a polar component, thereby ensuring excellent softening performance when being used in liquid carbon dioxide-based cleaning.

Further, the fabric softener for liquid carbon dioxide-based cleaning can block an increase in bubble generation, which is caused by vaporization as a result of a change in the phase of carbon dioxide, without decreasing pressure in a tub.

DETAILED DESCRIPTION

The present disclosure relates to a fabric softener composition that ensures high usability for high-pressure liquid carbon dioxide cleaning. Specifically, the disclosure relates to a fabric softener composition for liquid carbon dioxide-based cleaning, which can ensure excellent solubility of a softener component in liquid carbon dioxide and block generation of bubbles, caused by a change in the phase of the liquid carbon dioxide, thereby exhibiting a fabric softening ability without damaging laundry to be washed.

The fabric softener composition for luquid carbon dioxide-based cleaning can include an organic solvent expressed as a following chemical formula 1, and a cationic surfactant.

The organic solvent included in the composition will be described below. The organic solvent can be used to dissolve a softening component of a fabric softener effectively, without causing a change in the phase of the liquid carbon dioxide, which is made due to a reduction in the pressure in a tub. The organic solvent can be an alkyl carbonate-based solvent, and expressed as the following chemical formula 1.

$R_1$—O—(CO)—O—$R_2$ [Chemical formula 1]

(In chemical formula 1, $R_1$ and $R_2$ can be hydrogen (H) or an alkyl group having 1 to 4 carbon atoms, and can be identical with each other or different from each other.)

The alky carbonate-based organic solvent can exhibit excellent affinity with a wide range of polar solvents and non-polar solvents and can have an excellent ability to mix with the liquid carbon dioxide that is a non-polar solvent in the tub. Additionally, the alky carbonate-based organic solvent can show excellent affinity with various types of materials including an organic solvent such as petroleum-based, chlorine-based, ring-type silicon or silicon-based, fluorine-based, terpene oil-based organic solvents, and a soluble material such as an anionic surfactant and a cationic surfactant, and the like.

Accordingly, the alky carbonate-based organic solvent can be used to maintain a homogeneous phase of a raw material when a non-polar liquid carbon dioxide solvent and a polar cationic surfactant are mixed.

For example, the organic solvent can include one or more selected from a group comprising propylene carbonate, ethylene carbonate, trimethyl carbonae, dimethyl carbonate and dimethyl dicarbonate, but not limited thereto.

Hereafter, a cationic surfactant included in the composition will be described.

The composition can include a cationic surfactant that exhibits excellent affinity with the organic solvenet described above, and preferaly, a cationic surfactant expressed as a following chemical formula 2 or 3.

[Chemical formula 2]

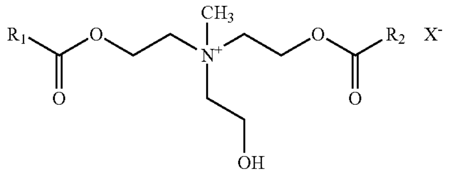

(In chemical formula 2, $R_1$ and $R_2$ are can be alkyl or alkenyl group having 8 to 22 carbon atoms, and identical with each other or different from each other, and X can be one of Cl, $CH_3OSO_3$ and $CH3CH_2OSO_3$.)

[Chemical formula 3]

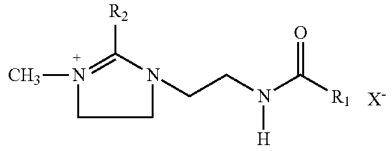

(In chemical formula 3, $R_1$ can be an alkyl or alkenyl group having 8 to 22 carbon atoms while $R_2$ is hydrogen (H) or an alkyl or alkenyl group having 1 to 4 carbon atoms, and X can be one of Cl, $CH_3OSO_3$, and $CH_3CH_2OSO_3$.)

For example, the cationic surfactant can include one or more selected from a group comprising distearic ester ammonium salt, dioleic ester ammonium salt, dilauric ester ammonium salt, monostearyl aminoethylene imidazoline ammonium salt, monooleic aminoethylene imidazoline ammonium salt, and monolauryl aminoethylene imidazoline ammonium salt, but not limited thereto.

Hereafter, an exemplary fabric softener composition for liquid carbon dioxide cleaning will be described.

The fabric softener composition for liquid carbon dioxide cleaning can include 5-10 wt % of the organic solvent, 5-25 wt % of the cationic surfactant, and water that is the remaining part.

First, 5-10 wt % of the organic solvent can be included in the fabric softener composition for liquid carbon dioxide cleaning.

When less than 5 wt % of the organic solvent is included in the composition, a liquid phase of the composition can be a suspension phase. Accordingly, the cationic surfactant in the raw materials for the composition is not sufficiently soluble in water, and when the suspension-phase composition is used in a liquid carbon dioxide, a surface area of a particle of the cationic surfactant can increase, and a state pressure of the liquid carbon dioxide in contact with the surface area of the particle of the cationic surfactant can decrease. In this case, the liquid carbon dioxide partially can vaporize, causing a change in the phase of the liquid carbon dioxide. Thus, while the liquid carbon dioxide vaporizes on the surface of the particle of the cationic surfactant, bubbles may be generated, and laundry to be washed such as fabrics and clothes may be damaged.

When greater than 10 wt % of the organic solvent is included in the composition, softening performance can decrease. To prevent this from happening, the content of the organic solvent can be limited to 10 wt %, for example.

Then 5-25 wt % of the cationic surfactant can be included in the fabric softener composition for liquid carbon dioxide cleaning.

When less than 5 wt % of the cationic surfactant is included in the composition, a softener component is not sufficient in the composition, and fabric softening performance may deteriorate. When greater than 25 wt % of the cationic surfactant is included in the composition, sufficient emulsification and dispersion may not be ensured, and a suspension phase may be created when a fabric softener is manufactured.

Additionally, the fabric softener composition for liquid carbon dioxide cleaning can further include water as a remaining part in addition to the organic solvent and the cationic surfactant.

Hereafter, implementations are specifically described.

EXAMPLES

1. Preparation of Implementations and Comparative Example

To prepare a fabric softener for liquid carbon dioxide-based cleaning, the organic solvent and the cationic surfactant were added in water and stirred at room temperature until the organic solvent and the cationic surfactant became a transparent liquid.

Components and compositions of the organic solvent and the cationic surfactant are shown in table 1 below.

TABLE 1

| | Organic solvent (wt %) | | | | | Cationic surfactant (wt %) | | | | Anionic surfactant (wt %) | |
|---|---|---|---|---|---|---|---|---|---|---|---|
| Examples | A1 | A2 | A3 | A4 | A5 | B1 | B2 | B3 | B4 | C1 | Water |
| Implementation 1 | 5 | | | | | 5 | | | | | Remaining part |
| Implementation 2 | | 10 | | | | | 5 | | | | Remaining part |
| Implementation 3 | 5 | | | | | 25 | | | | | Remaining part |
| Implementation 4 | | | 10 | | | | 25 | | | | Remaining part |
| Implementation 5 | 7 | | | | | 15 | | | | | Remaining part |
| Implementation 6 | | | 2 | | | | 5 | | | | Remaining part |
| Implementation 7 | | 4 | | | | 25 | | | | | Remaining part |
| Implementation 8 | 5 | | | | | | 4 | | | | Remaining part |
| Implementation 9 | | | 10 | | | 4 | | | | | Remaining part |
| Implementation 10 | 2 | | | | | | 3 | | | | Remaining part |
| Implementation 11 | | 5 | | | | | 5 | | | | Remaining part |

TABLE 1-continued

| | Organic solvent (wt %) | | | | | Cationic surfactant (wt %) | | | | Anionic surfactant (wt %) | |
|---|---|---|---|---|---|---|---|---|---|---|---|
| Examples | A1 | A2 | A3 | A4 | A5 | B1 | B2 | B3 | B4 | C1 | Water |
| Implementation 12 | | | 10 | | | | | 5 | | | Remaining part |
| Implementation 13 | | 5 | | | | | 25 | | | | Remaining part |
| Implementation 14 | | | | 10 | | | | 25 | | | Remaining part |
| Implementation 15 | | 7 | | | | | 15 | | | | Remaining part |
| Implementation 16 | | | | 2 | | | | 5 | | | Remaining part |
| Implementation 17 | | | 4 | | | | 25 | | | | Remaining part |
| Implementation 18 | | 5 | | | | | | 4 | | | Remaining part |
| Implementation 19 | | | | 10 | | | 4 | | | | Remaining part |
| Implementation 20 | | 2 | | | | | | 3 | | | Remaining part |
| Implementation 21 | | | 5 | | | | | 5 | | | Remaining part |
| Implementation 22 | | | | 10 | | | | | 5 | | Remaining part |
| Implementation 23 | | | 5 | | | | | 25 | | | Remaining part |
| Implementation 24 | | | | | 10 | | | | 25 | | Remaining part |
| Implementation 25 | | | 7 | | | | | 15 | | | Remaining part |
| Implementation 26 | | | | | 2 | | | | 5 | | Remaining part |
| Implementation 27 | | | | 4 | | | | 25 | | | Remaining part |
| Implementation 28 | | | 5 | | | | | | 4 | | Remaining part |
| Implementation 29 | | | | | 10 | | | 4 | | | Remaining part |
| Implementation 30 | | | 2 | | | | | | 3 | | Remaining part |
| Comparative example | | | | | | 12 | | | | 12 | Remaining part |

A1: Propylene carbonate
A2: Ethylene carbonate
A3: Dimethyl carbonate
A4: Trimethyl carbonae
A5: Dimethyl dicarbonate
B1: Monooleic aminoethylene imidazoline ammonium salt
B2: Monostearyl aminoethylene imidazoline ammonium salt
B3: Distearic ester ammonium salt
B4: Dioleic ester ammonium salt
C1: Alpha olefin sulfonate 2. Evaluation of Fabric Softening Ability A sample (a 100% cotton fabric) was prepared, and the implementations and the comparative example in table 1 were used as a fabric softener. To softening-treat the sample, 99 wt % of the liquid carbon dioxide, and 1 wt % of the fabric softener were injected into a tub for liquid carbon dioxide cleaning. The softening-treated sample was dried at room temperature of 20° C. at humidity of 65% for 24 hours, and then a skilled panelist performed sensory evaluation based on the sense of touch. Grades were given from 1 that is the lowest grade to 5 that is the highest grade. An average of grades that were marked in three evaluation tests was used to measure a softening effect. Results of the evaluation of the softening performance are shown in table 2.

Additionally, each of the fabric softener composition essences in the implementations and the comparative example were left in harsh conditions (an oven of 50° C., and an incubator of −5° C., for seven days), and a phase separation and transparency of the fabric softener composition essence were observed and evaluated with the naked eye. After seven days, degrees of the phase suspension and separation of the fabric softener essence were evaluated as good and poor. When the fabric softener essence was transparent without a change in its phase, the fabric softener essence was evaluated as excellent.

Results of the evaluation of the above performance and phase stability are shown in table 2.

TABLE 2

| Examples | Phase stability (50° C.) | Phase stability (−5° C.) | Softening ability |
|---|---|---|---|
| Implementation 1 | Excellent | Excellent | ◎ |
| Implementation 2 | Excellent | Excellent | ◎ |
| Implementation 3 | Excellent | Excellent | ◎ |

TABLE 2-continued

| Examples | Phase stability (50° C.) | Phase stability (−5° C.) | Softening ability |
|---|---|---|---|
| Implementation 4 | Excellent | Excellent | ◎ |
| Implementation 5 | Excellent | Excellent | ◎ |
| Implementation 6 | Good | Good | ○ |
| Implementation 7 | Good | Good | ○ |
| Implementation 8 | Good | Excellent | Δ |
| Implementation 9 | Excellent | Good | Δ |
| Implementation 10 | Good | Good | Δ |
| Implementation 11 | Excellent | Excellent | ◎ |
| Implementation 12 | Excellent | Excellent | ◎ |
| Implementation 13 | Excellent | Excellent | ◎ |
| Implementation 14 | Excellent | Excellent | ◎ |
| Implementation 15 | Excellent | Excellent | ◎ |
| Implementation 16 | Good | Good | ○ |
| Implementation 17 | Good | Good | ○ |
| Implementation 18 | Good | Excellent | Δ |
| Implementation 19 | Excellent | Good | Δ |
| Implementation 20 | Good | Good | Δ |
| Implementation 21 | Excellent | Excellent | ◎ |
| Implementation 22 | Excellent | Excellent | ◎ |
| Implementation 23 | Excellent | Excellent | ◎ |
| Implementation 24 | Excellent | Excellent | ◎ |
| Implementation 25 | Excellent | Excellent | ◎ |
| Implementation 26 | Good | Good | ○ |
| Implementation 27 | Good | Good | ○ |
| Implementation 28 | Good | Excellent | Δ |
| Implementation 29 | Excellent | Good | Δ |
| Implementation 30 | Good | Good | Δ |
| Comparative example | Poor | Poor | X |

Based on the test results, the fabric softener composition for liquid carbon dioxide-based cleaning, which is manufactured as a result of addition of a specific organic solvent and a cationic surfactant, has excellent phase stability at a high temperature of (50° C.) and a low temperature (−5° C.). Accordingly, the fabric softener composition for liquid carbon dioxide-based cleaning exhibits excellent fabric softening performance without causing deformation of fabrics and clothes under high-pressure conditions such as liquid carbon dioxide.

Further, in implementations 6 to 10, 16 to 20, and 26 to 30, proper content of the organic solvent and the cationic surfactant was not included in the composition. Accordingly, implementations 6 to 10, 16 to 20, and 26 to 30 show poorer phase stability and softening performance than the other implementations.

Furthermore, the comparative example (a fabric softener on the market) including no organic solvent showed poor phase stability, exhibited no softening performance, and damaged the sample.

What is claimed is:

1. A fabric softener composition for liquid carbon dioxide-based cleaning, comprising:

an organic solvent expressed as chemical formula 1; and a cationic surfactant, wherein the chemical formula 1 is:

$R_1$—O—(CO)—O—$R_2$, and wherein $R_1$ and $R_2$ are hydrogen (H) or an alkyl group having 1 to 4 carbon atoms, wherein the cationic surfactant comprises a compound expressed as chemical formula 3, wherein the chemical formula 3 is:

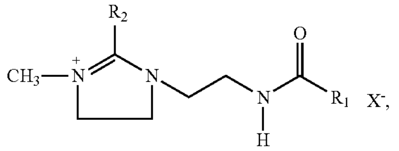

and wherein $R_1$ is an alkyl or alkenyl group having 8 to 22 carbon atoms, $R_2$ is (H) or an alkyl or alkenyl group having 1 to 4 carbon atoms, and X is one of Cl, $CH_3OSO_3$, and $CH_3CH_2OSO_3$.

2. The fabric softener composition of claim 1, wherein the organic solvent comprises one or more selected from the group consisting of propylene carbonate, ethylene carbonate, trimethyl carbonate, dimethyl carbonate, and dimethyl dicarbonate.

3. The fabric softener composition of claim 1, wherein the cationic surfactant further comprises a compound expressed as chemical formula 2, wherein the chemical formula 2 is:

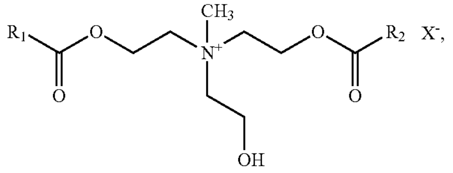

and wherein $R_1$ and $R_2$ are an alkyl or alkenyl group having 8 to 22 carbon atoms and, and X is one of Cl, $CH_3OSO_3$ and $CH_3CH_2OSO_3$.

4. The fabric softener composition of claim 1, comprising:

5-10 wt % of the organic solvent;

5-25 wt % of the cationic surfactant; and water as a remaining part.

* * * * *